US008254977B2

(12) United States Patent
Fernandez-Corbaton et al.

(10) Patent No.: US 8,254,977 B2
(45) Date of Patent: Aug. 28, 2012

(54) CENTRALIZED MEDIUM ACCESS CONTROL ALGORITHM FOR CDMA REVERSE LINK

(75) Inventors: Ivan Jesus Fernandez-Corbaton, Nuremberg (DE); Ahmad Jalali, Rancho Santa Fe, CA (US); Jordi de los Pinos Pont, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1303 days.

(21) Appl. No.: 11/441,651

(22) Filed: May 25, 2006

(65) Prior Publication Data
US 2007/0178927 A1    Aug. 2, 2007

Related U.S. Application Data

(60) Provisional application No. 60/762,763, filed on Jan. 27, 2006.

(51) Int. Cl.
H04B 7/00    (2006.01)
H04Q 7/20    (2006.01)
(52) U.S. Cl. ........ 455/522; 455/69; 455/517; 455/67.13
(58) Field of Classification Search .................. 455/522, 455/69, 517, 423, 67.11, 67.13, 68, 452.2, 455/552.1, 343.1; 370/332, 318, 335
See application file for complete search history.

(56) References Cited

U.S. PATENT DOCUMENTS

| 6,512,931 | B1 * | 1/2003 | Kim et al. ...................... 455/522 |
| 6,879,572 | B1 * | 4/2005 | Ayyagari et al. ............... 370/335 |
| 2002/0094837 | A1 * | 7/2002 | Hamabe et al. ................ 455/522 |
| 2003/0086366 | A1 | 5/2003 | Branlund |
| 2003/0114127 | A1 * | 6/2003 | Baldwin ..................... 455/245.1 |
| 2004/0218533 | A1 | 11/2004 | Kim et al. |
| 2005/0054364 | A1 * | 3/2005 | Jokinen et al. ................. 455/522 |
| 2005/0058151 | A1 | 3/2005 | Yeh |
| 2005/0143119 | A1 * | 6/2005 | Chandra et al. ............... 455/522 |
| 2005/0153667 | A1 * | 7/2005 | Cave et al. .................... 455/90.3 |

FOREIGN PATENT DOCUMENTS

| CN | 1697352 A | 11/2005 |
| CN | 1868230 A | 11/2006 |
| JP | 08181653 | 7/1996 |
| JP | 2001517893 A | 10/2001 |
| JP | 2002190774 A | 7/2002 |

(Continued)

OTHER PUBLICATIONS

International Search Report and Written Opinion—PCT/US2007/061123, International Search Authority—European Patent Office—May 31, 2007.

(Continued)

Primary Examiner — John Lee
(74) Attorney, Agent, or Firm — Jeffrey D. Jacobs

(57) ABSTRACT

A novel MAC algorithm is disclosed having various features for a modern CDMA interference-shared reverse link, including (a) link quality assurance, (b) individual congestion control, (c) variable data rate transition policy, and/or (d) reverse link partitioning. Link quality assurance is provided by monitoring transmission feedback information (ACK/NACK) to indirectly determine the quality of a communication link. Wireless devices are individually targeted to perform congestion control of the reverse link. Variable data transmission rates and discontinuous transmissions are achieved by individual wireless devices that autonomously adjust their transmission rate and transmit power. The reverse link can also be partitioned among the different wireless devices by individually controlling the transmit power of the wireless devices operating on the reverse link.

16 Claims, 5 Drawing Sheets

FOREIGN PATENT DOCUMENTS

| | | | |
|---|---|---|---|
| JP | 2002520983 | A | 7/2002 |
| JP | 2005518109 | T | 6/2005 |
| TW | 485718 | | 5/2002 |
| WO | WO9916185 | A1 | 4/1999 |
| WO | WO0004649 | A1 | 1/2000 |
| WO | WO02100053 | | 12/2002 |
| WO | WO2004075596 | | 9/2004 |

OTHER PUBLICATIONS

Tinnakornsrisuphap et al. "On the Fairness and Stability of the Reverse-Link MAC layer in CDMA2000 1XEV-Do" Communications, 2004 IEEE International Conference on Paris, France Jun. 20-24, 2004, Piscataway, NJ, USA, IEEE, Jun. 20, 2004 pp. 144-148, XP010710362.

Taiwan Search Report—TW096103241—TIPO—Jul. 5, 2011.

* cited by examiner

CENTRALIZED MEDIUM ACCESS CONTROL ALGORITHM FOR CDMA REVERSE LINK

CLAIM OF PRIORITY UNDER 35 U.S.C. §119

The present Application for Patent claims priority to Provisional Application No. 60/762,763 entitled "Centralized Medium Access Control Algorithm for CDMA Reverse Link" filed Jan. 27, 2006, and assigned to the assignee hereof and hereby expressly incorporated by reference herein.

BACKGROUND

1. Field

Various embodiments of the invention pertain to wireless communication systems. At least one embodiment of the invention pertains to a system and method for Medium Access Control (MAC) of a wireless communication system.

2. Background

Code Division Multiple Access (CDMA) is a wireless communication technique used by many modern communication systems. CDMA is a spread-spectrum communication protocol that utilizes coded signals occupying the same spectral bandwidth (e.g., 1.25 MHz). Typically, the orthogonally coded signals are used on the forward link (e.g., base stations to user terminals) while coded signals of arbitrary orthogonality are used on the reverse link. A CDMA signal is spread by one of N (e.g. N=64) codes (e.g., Walsch codes or "spreading codes") that spread the signal over a bandwidth range (e.g., approximately 1.25 MHz). In order to allow several users to simultaneously share the same frequency band, the user Access Terminals (AT) employ different or random codes to spread their transmitted waveforms. Such a multiplexing strategy results in what is known as an "interference shared" link. Two important characteristics of this type of link are that (1) the different AT transmissions interfere with each other and (2) the aggregate received power at the base station antenna(s) is tied to the stability and coverage of the communications system. As the aggregate received power increases, both the stability and coverage of the communication system worsen.

Since individual channel conditions and the total number of users present in a communication system can vary with time, a set of control algorithms is used to ensure that the maximum number of users have communication links that meet their grade of service requirements while the total amount of power received remains under a predetermined level. Such algorithms are typically known as Medium Access Control (MAC) algorithms and regulate the "sharing" of the aggregate power among the ATs.

One problem in designing such MAC schemes is the partitioning of a total resource between many users while assuring certain levels of performance for the ATs communication links. Effective MAC algorithms typically rely on some feedback between the Access Network (AN), which typically includes one or more base stations, and the ATs. One typical method of control feedback is the Power Control (PC) loop by which a base station can alter an AT's transmit power level through power control UP/DOWN commands sent on the forward link. As used herein, the "forward link" is the communication link from a base station to an AT and the "reverse link" is the communication link from the AT to the base station. The simplicity of the service requirements on early CDMA systems, where users would typically transmit the same type of traffic (voice) using the same data rate, allowed for relatively straightforward MAC algorithms. Since then however, more features have been introduced in response to the demand for extending the type of service beyond the constant bit rate and low latency "voice-like" traffic. For instance, support for discontinuous transmission, variable data rates and different types of traffic with different grade of service requirements. The reverse link of IS-856 Revision A [1] is a good example of such enhanced systems.

Supporting these new features has a significant effect on the complexity and effectiveness of the MAC algorithms, making it particularly difficult for the AN to control the behavior of each individual AT.

In conventional MAC algorithms, centralized congestion control is done on a sector-by-sector basis. A Reverse Activity Bit (RAB) is set and broadcasted by the AN and monitored by all ATs communicating through the AN. When turned On, the RAB indicates congestion and affects the data rate determination strategy of the ATs. Link monitoring is done by controlling the power for all users so that their frame error rate achieves some desired level, e.g., typically one percent or less. Normally, the data rate is decided by the AT in accordance with policies for increasing and decreasing the allowed rate which depend on the RAB. For instance, if the RAB is turned On, an AT is less likely to increase its data rate and more likely to decrease it. This type of congestion control is used to centrally control all ATs equally. However, this lack of individual congestion control limits flexibility when designing a policy for increasing the data rates. The inability of the AN to quickly address an individual AT, which may be taking up too much of the interference share (i.e., the AT's transmission power is too high), forces the system to apply stringent rules for allowing a rate increase.

SUMMARY

In one aspect, an apparatus comprises a communication interface for wirelessly communicating with one or more wireless devices through an interference shared communication channel; and a processing unit coupled to the communication interface and configured to determine a maximum received power limit for each of the one or more wireless devices, and send individualized power control commands to the one or more wireless devices to maintain their received power within their corresponding maximum received power limit.

In another aspect, a method for implementing medium access control comprises determining a maximum received power limit for each of one or more wireless devices operating on an interference shared communication channel; determining whether congestion is present in the communication channel; and implementing selective transmit power control of one or more of the wireless devices to achieve a desired congestion level.

In the above apparatus and method, determination may be made whether channel congestion is present in the communication channel. Congestion may be determined to be present if a ratio of the total power received from all wireless devices and the thermal noise for the communication channel is greater than a threshold amount. One or more of the maximum received power limits may be adjusted to reduce channel congestion if channel congestion is present. The reverse link of the communication channel may be partitioned among the one or more wireless devices. A minimum received power limit may be determined for each of the one or more wireless devices, and a power control command may be sent to one or more of the wireless devices to maintain their received power above their corresponding minimum received power limit.

In a further aspect, an apparatus comprises a wireless communication interface having an adjustable transmit power, the wireless communication interface for communicating with a base station via an interference shared reverse link communication channel; and a processing unit coupled to the wireless communication interface and configured to obtain a maximum transmit power limit, and autonomously adjust a transmission rate and the transmit power to meet a desired grade of service while maintaining the transmit power at or below the maximum transmit power limit.

In still another aspect, a method for media access control operational on a wireless device, comprises obtaining a maximum transmit power limit; and autonomously adjusting a reverse link transmission rate and transmit power to meet a desired grade of service while maintaining the transmit power at or below the maximum transmit power limit.

In the above apparatus and method, power control commands received through the wireless communication interface may be obeyed by adjusting the transmit power according to the power control commands. The receipt of power control commands may be monitored; and the maximum transmit power limit may be determined by ascertaining the power levels at which power control commands are received. Feedback information related to the decoding of previously transmitted information may be received; and a quality of service for the reverse link communication channel may be determined based on the feedback information. Power control down commands may be received from two or more sectors; and the lowest of the maximum transmit power limits associated with the two or more sectors may be selected for transmission.

It should be noted that the apparatus and/or method as described above may be implemented by a processor configured to perform one or more functions of the apparatus and/or method. Similarly, the apparatus and/or method as described may be implemented by a machine readable medium comprising instructions, wherein the instruction are configured to perform one or more functions of the apparatus and/or method.

DETAILED DESCRIPTION

Figure 1:
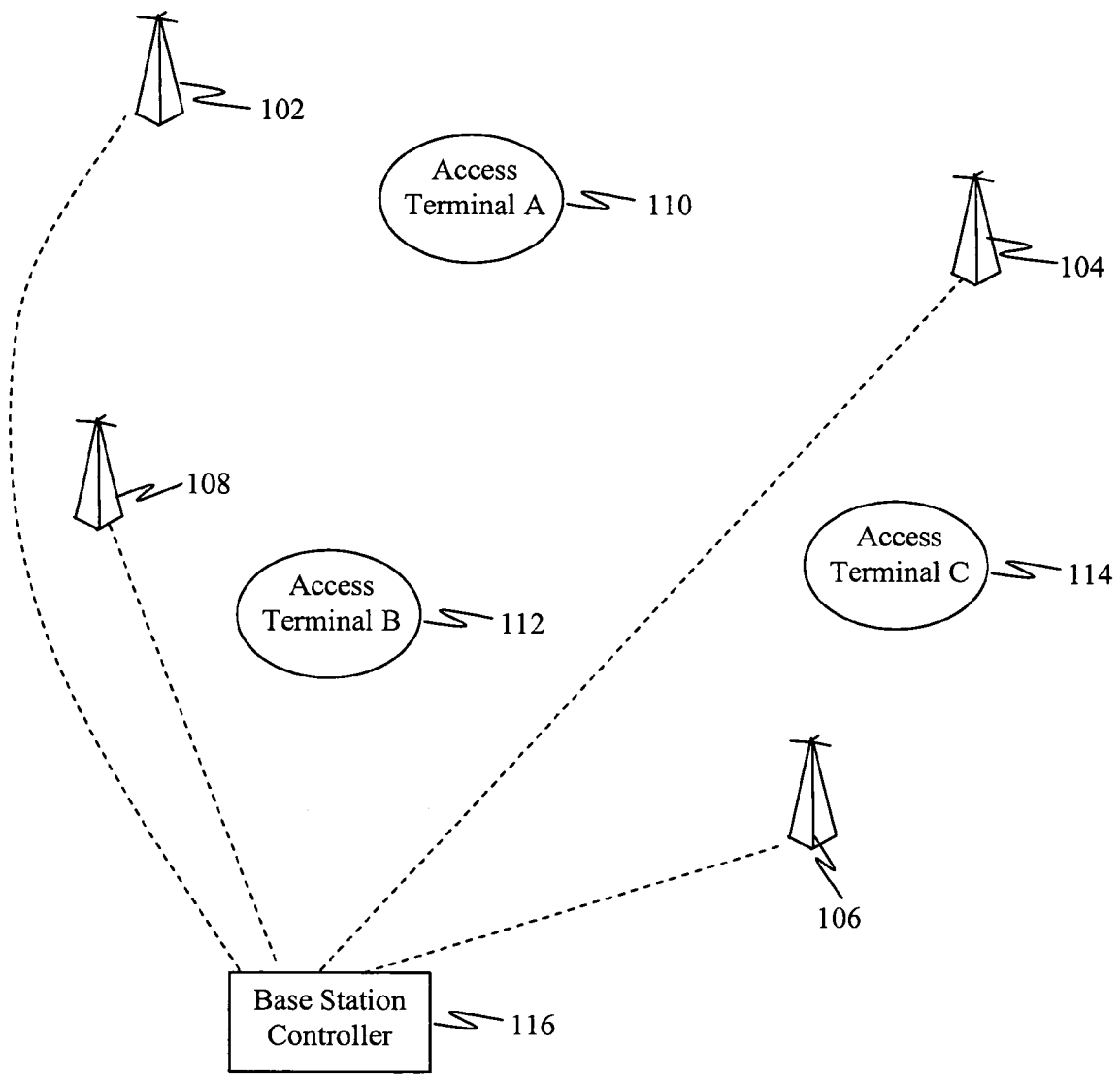
FIG. 1 illustrates an example wireless communication system implementing a MAC scheme.

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to, portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

A novel MAC algorithm is disclosed having various desirable features for a modern CDMA interference-shared reverse link, including (a) link quality assurance, (b) individual congestion control, (c) variable data rate transition policy, and/or (d) reverse link partitioning. This MAC design can avoid introducing new physical layer signaling channels, which may occupy much needed bandwidth capacity, by redefining the function of the already existing power channels and using information provided by the ACK/NACK channel that has been disregarded up to now.

A novel MAC scheme provides reverse link quality assurance by monitoring transmission feedback information (ACK/NACK) to indirectly determine the quality of a communication link. Another aspect of the MAC scheme provides the ability to target individual ATs to perform congestion control of the reverse link. Another feature of the MAC scheme supports variable data rates and discontinuous transmission between the AN and ATs, allowing individual ATs to autonomously adjust their transmission rate and transmit power. The MAC scheme can also partition the total channel resources among the different ATs by individually controlling the transmit power of the wireless devices operating on the reverse link.

FIG. 1 illustrates an example wireless communication system including a MAC scheme. An Access Network (AN) may include a plurality of base stations 102, 104, 106, and 108 that may implement a CDMA protocol to establish links with one or more Access Terminals (ATs) 110, 112, and 114. Access terminals may include various wireless devices, such as wireless telephones, cellular phones, wireless computing devices, wireless multimedia players, etc. A base station controller 116 may be coupled to the base stations 102, 104, 106, and 108, via communication links, to manage their operation. According to various implementations, the MAC algorithm is operational on the controller 116, one or more base stations 102, 104, 106, and 108, and/or ATs 110, 112, and 114, or a combination thereof, to regulate use of the communication channel and distribute the aggregate power among the ATs. In particular, the MAC algorithm manages the power perceived or received by the base stations. On the reverse link, the power received by an AN (e.g., base stations 102, 104, 106, and 108) from an AT may be less than the power transmitted by the AT to the AN due to power dissipation, environmental conditions, and/or geographical obstructions.

In the simplest scenario, there may be a number (U) of ATs communicating with an AN through their reverse links at a constant data rate r with a target frame error rate (FER) $\epsilon_0$. The Rise Over Thermal γ (ROT) (Equation 1) is defined as the ratio of the total power received from all ATs at an AN (e.g., the sum of received power $p_{uRx}$ from each individual AT as perceived at a base station) and the thermal noise $\sigma^2$. The ROT, which can serve as an indicator of congestion in a sector, can be expressed as $$\gamma = \frac{\sum_{u=1}^{U} p_{uRx} + \sigma^2}{\sigma^2} \quad \text{(Equation 1)}$$

Generally, the ROT γ for a sector is kept below a maximum threshold $\gamma_0$. For this simplified scenario it suffices that the MAC algorithm operational on the AN uses the power control commands UP or DOWN to set the individual transmit power $p_{uTx}$, the power transmitted from an AT based on the power received $p_{uRx}$ by the AN from the AT. Thus, the AN causes a maximum transmit power limit $p_{uTxMax}$ to be set for an AT based on the received power $p_{uRx}$ from the AT. Within this maximum transmit power limit $p_{uTxMax}$, the AT can change its transmit data rate r such that the frame error rate (FER) is $$\epsilon_u = \epsilon_0 \forall u = 1 \ldots U \quad \text{(Equation 2)}$$

subject to the constrain $\gamma \le \gamma_0$ (e.g., which is controlled by the AN setting the maximum transmit power limit received power limit $p_{uTxMax}$), where $\epsilon_u$ is the desired FER for the targeted AT. Depending on the values of U, r and $\gamma_0$, there might not be a set of transmit powers $p_u$ that provide the desired FER $\epsilon_u$. If so, then the communication system is said to be congested.

A conventional MAC algorithm, operational on the AN, would typically exercise congestion control, for instance, by denying service to some users so that they stop their reverse link transmissions, thereby alleviating the interference conditions for the remaining ATs. However, the disclosed MAC algorithm provides the ability to target specific ATs when congestion control is exercised. Various criteria may be used to select those ATs that are to be pruned or throttled (e.g., force a decrease in their transmission rate by decreasing their maximum transmit power $p_{uTxMax}$ using DOWN power control commands). For instance, an AT's resource utilization (e.g., Rise over Thermal), the type of service class (e.g., voice, data, etc.), and/or customer class may be employed by the MAC to individually decrease or control the transmission rate of an AT.

One implementation provides a MAC algorithm, operational on an access network AN (e.g., base station) and/or access terminals ATs, that provides congestion control of a wireless communication system while allowing an AT to increase and/or decrease its transmission rate r without affecting the predictability and controllability of the ROT (e.g., congestion indicator) by the AN. For example, the AN looks at the received power $p_{uRx}$ from the AT and causes a maximum transmit power $p_{uTxMax}$ to be set at the AT. The AT can then increase or decrease its transmission rate r, while keeping its transmit power $p_{uTx}$ at or below the maximum limit $p_{uTxMax}$.

Figure 2:
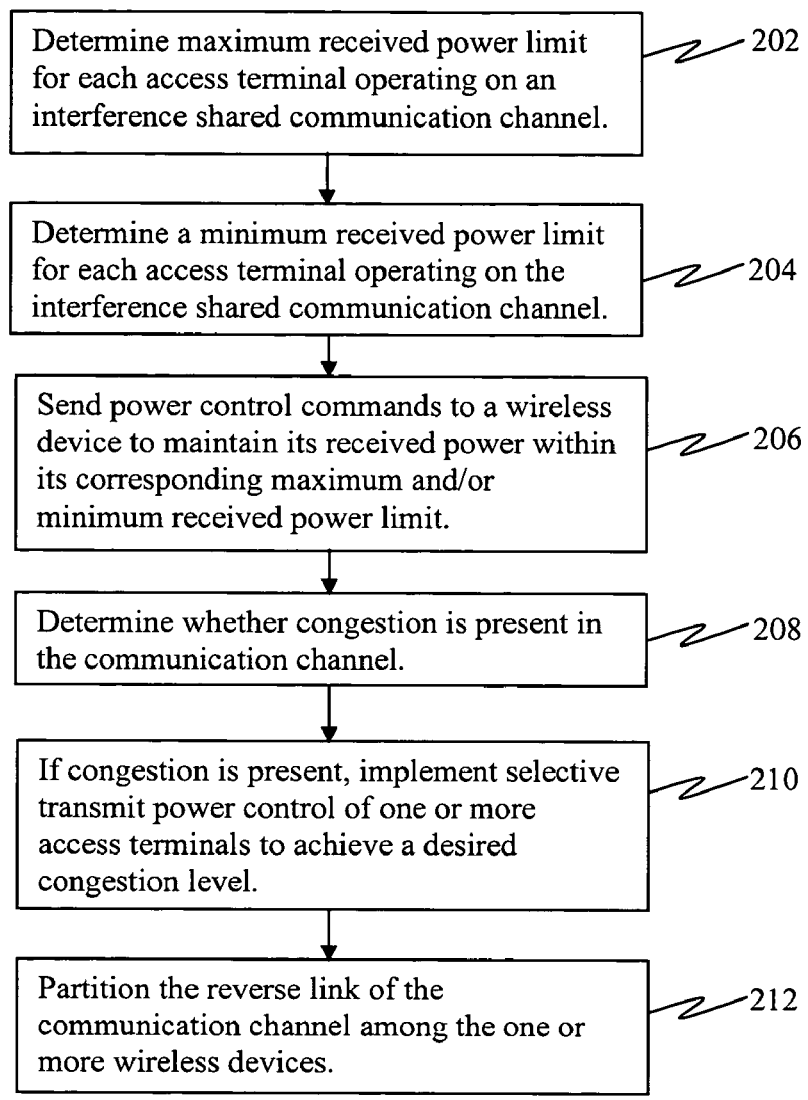
FIG. 2 is a flow diagram illustrating an example method for implementing congestion control by a centralized MAC algorithm.

FIG. 2 is a flow diagram illustrating an example method for implementing congestion control by a centralized MAC algorithm. In some implementations, this method may be implemented by the AN (e.g., base station(s) and/or base station controller). The maximum received power limit ($p_{uRxMax}$, where u=1 ... U), as received by the AN for each AT (for AT(u) where u=1 ... U) operating on an interference shared communication channel or sector, is determined 202. This maximum received power limit $p_{uRxMax}$ may be determined based on the desired congestion level (e.g., ROT γ) that the AN wishes to maintain for the sector. The minimum received power limit ($p_{uRxMin}$) (as received by the AN/base station) for each AT operating on an interference shared communication channel or sector may also be determined 204. This minimum received power limit $p_{uRxMin}$ may be the power level below which it is considered impractical to maintain the tracking loops and/or search for new signal multi-paths. Note that different channel conditions and/or modern demodulation techniques (e.g., multi-antenna beam-forming, etc.) may result in different power levels $p_u$ to sustain the same data rate r among different ATs. Thus, the maximum received power $p_{uRxMax}$ and minimum received power $p_{uRxMin}$ may be different for each AT in a sector.

An AN sends power control UP/DOWN commands to a wireless device (e.g., AT) to maintain its received power $p_{uRx}$ (as received by the AN) within its corresponding maximum $p_{uRxMax}$ and/or minimum $p_{uRxMin}$ received power limit 206. These UP/DOWN commands, in effect, increase or decrease the power transmitted $p_{uRx}$ by the wireless device (e.g., AT). The AN determines whether congestion is present in the communication channel 208 by monitoring whether ROT is greater than a threshold $\gamma_0$, $$\frac{\sum_{u=1}^{U} p_{uRx} + \sigma^2}{\sigma^2} > \gamma_0 \quad \text{(Equation 3)}$$

If congestion is present, the AN implements selective power control (either indirect or direct) of the power transmitted $p_{uTx}$ by the one or more ATs to achieve a desired congestion level 210. The AN adjusts the transmitted power $p_{uTx}$ of an AT if the power received $p_{uRx}$ from that AT is greater than the maximum received power $p_{uRxMax}$ or less than the minimum power $p_{uRxMin}$. The maximum and minimum received powers $p_{uRxMax}$ and $p_{uRxMin}$ may be individually determined or set for each AT by the AN. That is, the AN may send a power control "UP" command to indicate that the AT increase its transmit power $p_{uTx}$, and/or a power control "DOWN" command to indicate that it decrease its transmit power $p_{uTx}$. The AT complies with these power control commands since they ensure that the power received $p_{uRx}$ by the AN is appropriate in order to minimize the interference caused to other ATs. Because of the use of power control commands, when congestion occurs, an AN can individual adjust the maximum power limits for each AT. A base station may use power control commands when a terminal AT is using too much or too little of the ROT, otherwise it does not use power control commands. Access terminal AT obeys the power control commands from the AN but can otherwise transmit more/less power or increase/decrease its transmission rate depending on the desired FER. In some implementations, in addition to the UP and DOWN power control commands from the AN, the AN can also transmit a "No Change" command which indicates that no change in the upper or lower transmit power limits is necessary. While receiving No Change commands from the AN, the AT may increase or decrease its transmit power $p_{uTx}$ as it sees fit.

The ability to set the maximum receive power $p_{uRxMax}$ also allows for the partitioning of the reverse link of the communication channel among the one or more wireless devices 212. That is, by individually controlling the amount of power received $p_{uRx}$ from each AT, the AN can regulate the interference that each AT contributes to the reverse link of the multiplexed communication channel in a sector. By individually regulating the received power $p_{uRxMax}$ from each AT in a sector, the AN can partition the reverse link as desired.

Since the maximum received power $p_{uRxMax}$ (and $p_{uRxMin}$) is determined by the MAC algorithm operating on an AN, this value is not accessible to the ATs. However, even an approximate knowledge of $p_{uRxMax}$ allows an AT to fully exercise the freedom of variable rate transmissions without having to receive continuous power control DOWN commands from the AN if it goes over the maximum permitted power limit. An AT can autonomously change its transmission rate r, as desired, if it has an approximate knowledge of its maximum received power limit $p_{uRxMax}$ (as determined by the AN through which the AT communicates). Thus, a MAC algorithm can be provided to be operational on an AT that controls its own transmission power $p_{uTx}$ based on an estimated maximum received power limit $p_{uRxMax}$. There are several options available for the AT to obtain the maximum received power limit $p_{uRxMax}$. These concepts can be modified to allow the AT to obtain the minimum received power limit $p_{uRxMin}$ if desired.

One method of obtaining a maximum received power limit $p_{uRxMax}$ is to have a per user (AT) physical layer signaling channel, similar to the current power control channel, where the AN sends the $p_{uRxMax}$ value to the AT. While implementing a control feedback loop by means of physical layer signaling (like power control signaling) is very desirable in terms of the speed at which commands can be sent, decoded and replied to, it may be a resource-costly option since these physical layer signaling channels are typically lightly coded which can significantly reduce the total capacity of the link used for their transmission. Thus, in some implementations, it may be desirable to avoid adding physical layer signaling channels to a new MAC, especially when each user (e.g., AT) would employ an individual channel.

A second method for an AT to obtain the maximum received power limit $p_{uRxMax}$ from the AN is to have a higher layer signaling channel that transfers the $p_{uRxMax}$ to the AT. In this scheme, the AN may use control packets to periodically inform each AT of its respective maximum received power limit $p_{uRxMax}$. Since the maximum received power limit $p_{uRxMax}$ is a quantity that typically varies more slowly than the update speeds of the physical layer signaling, a high signaling rate is not needed. This makes this second scheme a more attractive option than having a dedicated physical layer signaling channel.

Figure 3:
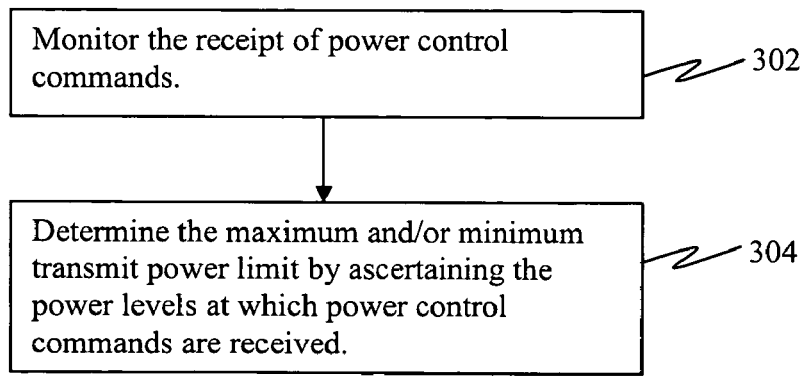
FIG. 3 illustrates an example method for an access terminal to indirectly obtain a maximum transmission power limit from its access network to enable the access terminal to autonomously control its transmission rate.

FIG. 3 illustrates an example method for an access terminal to indirectly obtain a maximum received power limit $p_{uRxMax}$ from its access network (AN) to enable the access terminal (AT) to autonomously control its transmission rate r and/or transmit power $p_{uTx}$. This method permits the ATs to individually estimate their $p_{uTxMax}$ values based on the power control DOWN commands received during regular operation. This scheme assumes no explicit communication of $p_{uRxMax}$ between the AN and the ATs. The AT monitors the receipt of power control commands 302. For instance, through power control DOWN commands, the AN decreases the transmit power $p_{uTx}$ of an AT whose received power has gone above the $p_{uRxMax}$ threshold. By tracking the transmit power levels $p_{uTx}$ at which the power control DOWN/IP commands are received, the AT may ascertain the maximum $p_{uTxMax}$ and/or minimum $p_{uTxMin}$ transmit power limits at which these power control commands are received 304. Thus, the AT can determine the transmit power levels $p_{uTx}$ at which it exceeds its allocated share of interference and can thus modify its transmission policy. For example, for a time τ after the last power control DOWN command, the AT can autonomously regulate its transmitter to prevent it from reaching the same power level that triggered the power control DOWN command 304. The value of τ may be selected to balance between the ability to quickly determine when the AN has increased the $p_{uRxMax}$ threshold (e.g., τ is as short as possible for this purpose), and the controllability of the AT's behavior which increases with τ.

By obtaining a maximum transmit power limit $p_{uTxMax}$ and/or minimum transmit power limit $p_{uTxMin}$, using one or more of the methods described above, an AT can implement variable transmission rate control of its reverse link.

Figure 4:
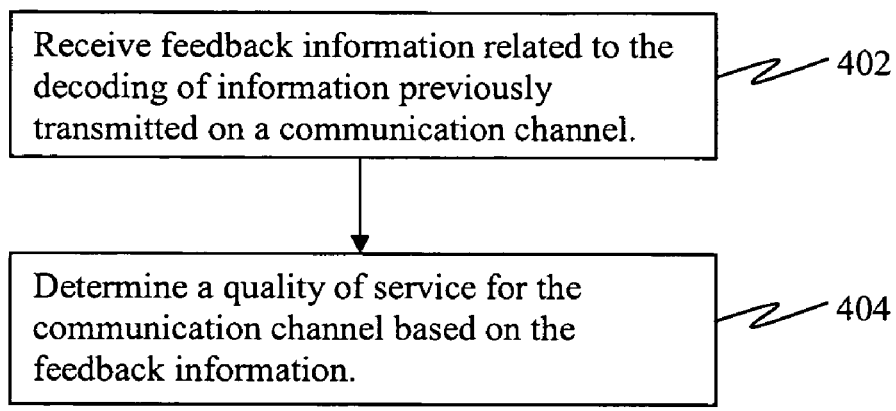
FIG. 4 is a flow diagram illustrating an example feature that enables an access terminal monitor the quality of its reverse link to achieve a desired maximum frame error rate.

FIG. 4 is a flow diagram illustrating an example feature that enables an access terminal to monitor the quality of its reverse link to achieve a desired frame error rate.

Generally, an AT receives feedback information related to the decoding of information previously transmitted on a communication channel 402. Modern reverse link protocols include Hybrid Automatic Repeat requests (H-ARQ) by which an AN quickly informs an AT of the result of a decoding process by means of the ACK/NACK physical layer channel. An AN or base station may send a bit or symbol to an AT indicating whether a transmitted frame (from the AT to the AN) was successfully decoded (ACK), or whether the frame was not successfully decoded (NACK). Upon receiving an ACK, the AT knows that the current frame was successfully decoded and can therefore transmit a new frame to the AN during the next transmission period. Conversely, receipt of a NACK denotes a decoding error and the AT sends redundant information to the AN in order to increase the chances of successfully decoding the frame. This scheme increases system capacity under many channel conditions.

The AT determines a quality of service for the communication channel based on the feedback information 404. The ACK/NACK mechanism allows an AT to figure out its frame error rate (FER) as seen by the AN. In particular, an access terminal AT can track its FER using the ACK/NACK bits coming from the base station AN. The AT can therefore choose a transmission rate that results in the desired FER. This can be used by the ATs to autonomously make a transmit power and/or rate adjustments on its reverse link in order to meet its quality of service requirements without explicit AN control. In a sense, the binary ACK/NACK channel, transmitted in the forward link by the AN to the ATs, is partially redundant with the current way of doing power control (e.g., UP/DOWN control commands) since both channels somehow inform the AT of the state of the reverse link. One feature allows an AT to use the ACK/NACK bits to autonomously set its transmit power and/or transmission rate.

Figure 5:
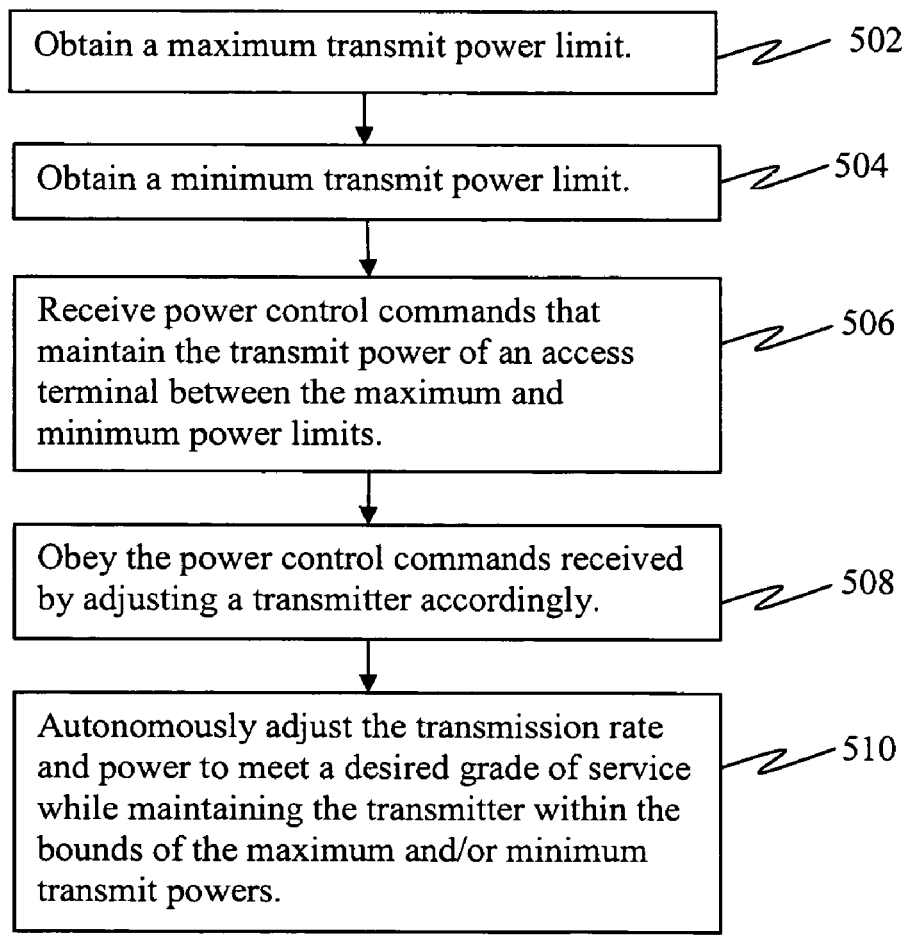
FIG. 5 illustrates an example method using ACK/NACK information on a forward link to enable an access terminal to autonomously adjust its transmit power and rate to meet a desired frame error rate.

FIG. 5 illustrates an example method using ACK/NACK information on a forward link to enable an AT to autonomously adjust its transmit power and rate to meet a desired frame error rate. An AT obtains a maximum transmit power limit $p_{uTxMax}$ 502 and a minimum transmit power limit $p_{uTxMin}$ 504. The AN may determine maximum $p_{uRxMax}$ and minimum $p_{uRxMin}$ received power limits based on its desired congestion levels. The AT may then determine or estimate the value of its maximum transmit power $p_{uTxMax}$ (corresponding to the maximum received power $p_{uRxMax}$ at the AN) and/or the minimum transmit power $p_{uTxMin}$ (corresponding to the minimum received power $p_{uRxMin}$ at the AN), by one or more of the methods described herein. The AT receives power control commands (e.g., UP, DOWN, No Change, etc.) from the AN that causes the AT to maintain its transmission power $p_{uTx}$ between a maximum and minimum power threshold 506. The AT obeys these power control commands from the AN by adjusting its transmitter accordingly 508. This allows for quick and individualized congestion control. While obeying power control commands from the AN (e.g., maintaining transmission power $p_{uTx}$ in the range $p_{uTxMin} < p_{uTx} < p_{uTxMax}$), the AT is free to change its transmission rate r and power $p_{uTx}$ to meet its grade of service requirements. Thus, an AT can autonomously adjust its transmission rate r and power $p_{uTx}$ to meet a desired grade of service while maintaining the transmitter within the bounds of the maximum $p_{uTxMax}$ and minimum $p_{uTxMin}$ transmit power limits 510. This may be done by using the ACK/NACK bits, as previously described, to monitor its frame error rate (FER), thereby assuring its quality of service. The ability to quickly power control down an "abusing" AT without having to be concerned about its FER (the AT decreases its transmission rate accordingly when it starts missing frames or packets) allows for much more aggressive transmission rate increase policies than current rate control schemes.

According to one feature, an AT may autonomously and incrementally adjust its transmission power $p_{uTx}$ and rate r to meet a desired frame error rate. For a time period k, an AT updates its estimated maximum transmit power limit $p_{kTxMax}$ where $\vec{p}_k$ is the R-dimensional vector that contains estimates of the transmit powers that achieve the desired FER for each available information transmit rate r=1 . . . R for the transmission period k. If the power control command is DOWN, then the AT updates the estimated maximum transmit power limit so that $p_{kTxMax} = p_{k-1} - \Delta$, where $\Delta$ is the amount by which the estimated maximum transmit power limit is decreased. If the power control command is UP, then the AT updates the estimated maximum transmit power limit so that $p_{kTxMax} = p_{k-1} + \Delta$, where $\Delta$ is the amount by which the estimated maximum transmit power limit is increased. Otherwise, when no power control command is received from the AN, the estimated maximum transmit power limit is updated as a function of previous power estimates, time $\tau$, and other factors ($p_{kTxMax} = f(p_{(k-1)TxMax}, \tau, \ldots)$). When a "No Change" or no power control command is received from an AN, the AT can adjust its transmission rate to achieve a desired FER.

Another option for increasing $p_{kTxMax}$ is to have the AN set a general bit (e.g., Acknowledge—ACK bit) that is transmitted on the forward link and informs the ATs that they are allowed to increase their transmit power $p_{kTx}$. For example, the transmit power $\vec{p}_{kTx}$ of an AT is updated by keeping track of received ACK bits and adjusting the power level according to the equation $$\vec{p}_{kTx} = \vec{p}_{(k-1)Tx} + \vec{1}((1-ACK_k)\delta^+ - ACK_k \delta^-) \qquad \text{(Equation 4)}$$

where $ACK_k=0$ if the decoding failed at the AN, $ACK_k=1$ if the decoding was successful, and $\delta^+$ and $\delta^-$ are the increments by which the transmit power is decreased or increased, respectively. $\vec{p}_{kTx}$ tracks the power level at which the AT transmits to have the desired FER. There may be as many $\vec{p}_{kTx}$ values as there are rates. When a packet is missed (NACK or ACK=0), it means that the AT's transmit power level is too low and the AT increases its transmit power. Additionally, when a packet is correctly received (ACK=1), then the AT can reduce it transmit power. That is, the transmit power $\vec{p}_{kTx}$ provides an estimate of how much power is to be used on subsequent transmissions. The transmit power $\vec{p}_{kTx}$ is increased by $\delta^+$ or decreased by $\delta^-$ according to the logical state of the ACK bit, transmit power $\vec{p}_{kTx}$ is increased if the previous transmission decoding failed and decreased if the previous transmission decoding was successful. The transmit data rate r is determined according to $$\text{minimum } (r_k, r_{max} \text{ while } \vec{p}(r)_k \leq p_{kTxMax})$$

where $r_k$ is the desired transmit rate from the upper layers at a particular time k, $r_{max}$ is the maximum allowed rate while the transmit power $\vec{p}(r)_k$ is kept at or below the maximum transmit power limit $p_{kTxMax}$. Thus, the AT has a transmission rate r that is the lesser of its desired transmission rate $r_k$ and its maximum allowed transmission rate $r_{max}$.

Figure 6:
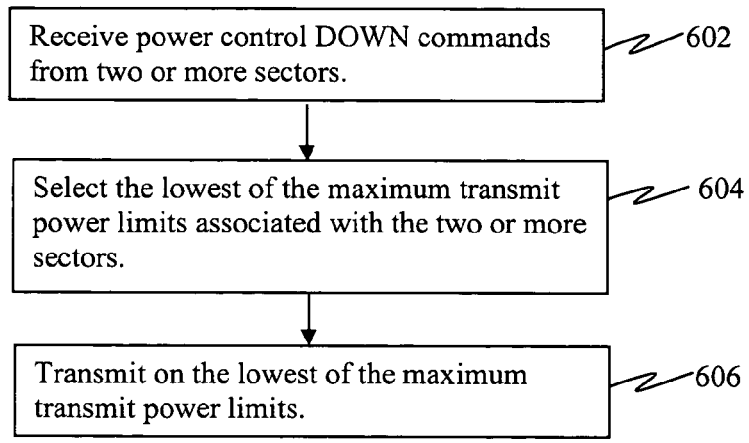
FIG. 6 is a flow diagram illustrating an example method for controlling transmit power in the presence of competing power control commands.

In some implementations, one or more active ATs in a communication system may be monitored and power controlled by more than one sector (e.g., different base stations or different networks). FIG. 6 is a flow diagram illustrating an example method for controlling transmit power in the presence of competing power control commands. In a particular communication system, an AT may receive power control DOWN commands, for instance, from two or more sectors 602. That is, if two sectors are using the proposed centralized MAC, their particular assignments of maximum received power $p_{uRxMax}$ for a particular AT could result in two different maximum received power limits $p_{uRxMax}$ for the same AT. The AT may decide between these two or more maximum receive power limits $p_{uRxMax}$ by applying an "OR" function to the power control DOWN commands received from more than one sector. Specifically, the AT selects the lowest (e.g., most restrictive) of the maximum transmit power limits $p_{uTxMax}$ associated with the two or more sectors 604. The lowest maximum transmit power limit may be that transmit power level $p_{uTxMax}$ at which no more power control DOWN commands are received from any of the sectors. By choosing to operate its transmitter at the lesser of the two or more maximum transmit power limits, the AT keeps its interference on the reverse link below the specified thresholds for the one or more sectors. The AT may then transmit on the lowest of the maximum transmit power limits 606.

The method illustrated in FIG. 6 may be also implemented by an AT to select between two or more power control UP commands in some MAC implementations. Additionally, between an UP command and a DOWN command from two or more different base stations, the AT obeys the DOWN commands. That is, as long as one base station sends a DOWN command to the AT, the AT obeys such DOWN command. This guarantees that none of the AT's are negatively impacted by transmissions from an AT in their vicinity.

Figure 7:
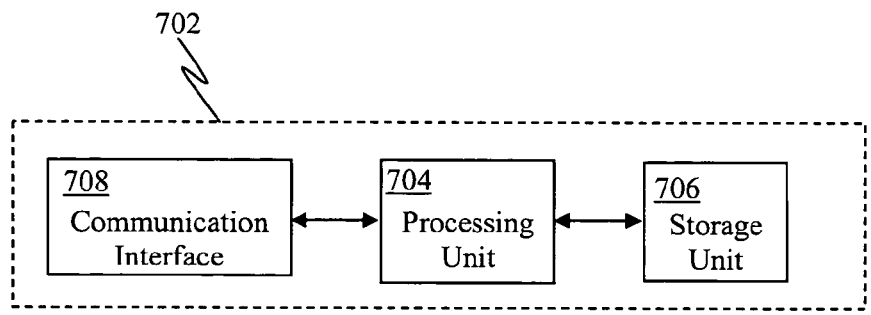
FIG. 7 illustrates an example apparatus that implements one or more features of a MAC algorithm.

FIG. 7 illustrates an example apparatus 702 that may implement one or more features of a MAC algorithm. Apparatus 702 may be part of a base station, AT, and/or controller, and include a processing unit 704, a storage unit 706, and a communication interface 708. The processing unit 704 may obtain instructions, data, and/or other information stored in the storage unit to implement the MAC algorithm. The processing unit 704 may send and receive communications from external wired or wireless devices through the wired or wireless communication interface 708 to implement the MAC algorithm. In various implementations, the apparatus may implement one or more of the features for link quality assurance, individual congestion control, variable data rate transition policy, and/or reverse link partitioning described herein.

Figure 8:
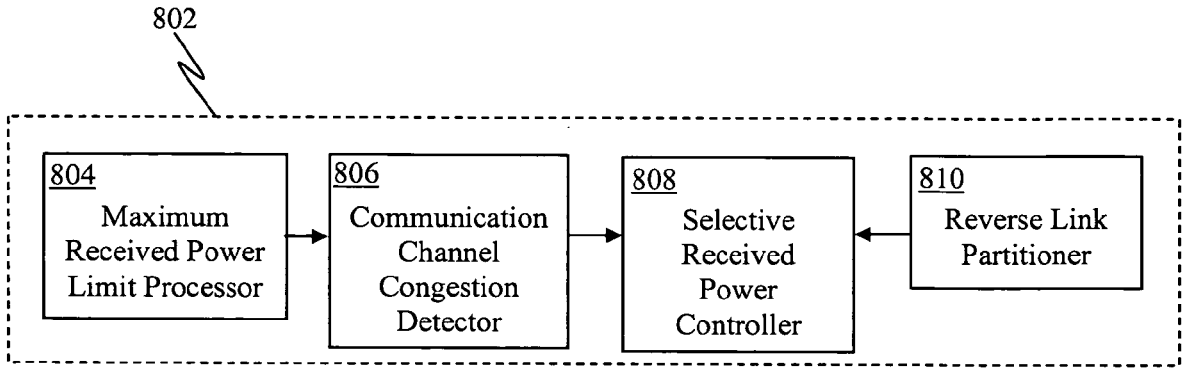
FIG. 8 illustrates example components of an access network device configured to perform reverse link channel congestion control and reverse link partitioning.

FIG. 8 illustrates example components of an access network AN device 802, such as a base station, configured to perform reverse link channel congestion control and reverse link partitioning. The access network device 802 includes a maximum received power processor 804 configured to determine a maximum received power limit for each of one or more wireless devices operating on an interference shared communication channel. A communication channel congestion detector 806 is configured to determine whether congestion is present in the communication channel. A selective received power controller 808 implements selective received power control of the one or more wireless devices to achieve a desired congestion level. A reverse link partitioner 810 allows partitioning of the reverse link of the communication channel among the one or more wireless devices operating on the reverse link of the communication channel by individually adjusting the maximum received power limit for the one or more wireless devices.

Figure 9:
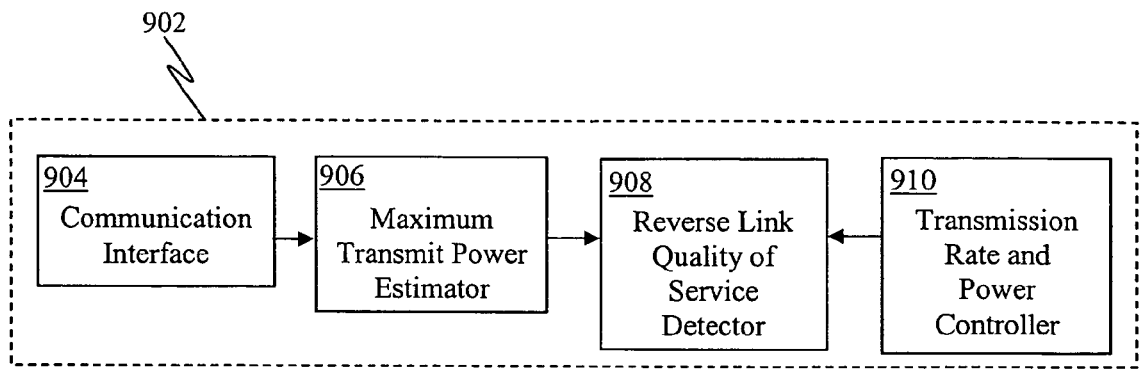
FIG. 9 illustrates example components of a wireless device configured to indirectly determine its reverse link quality of service and adjust its transmission rate and power.

FIG. 9 illustrates components of a wireless device AT 902 configured to indirectly determine its reverse link quality of service and adjust its transmission rate and power. The wireless device 902 may optionally include a communication interface 904 for receiving power control commands. The wireless device 902 includes a maximum transmit power estimator 906 that estimates a maximum transmit power limit by ascertaining the power levels at which power control commands are received. The wireless device 902 also includes a quality of service detector for determining the quality of service over the reverse link of the communication channel based on feedback of whether transmitted information was successfully decoded. A transmission rate and power controller 910 allows adjusting the reverse link transmission rate and transmit power so that the quality of service meets the desired grade of service.

One or more of the components and functions illustrated in FIGS. 7, 8 and/or 9 may be rearranged and/or combined into a single component or embodied in several components without departing from the invention. Additional elements or components may also be added without departing from the invention. The apparatus, devices, and/or components illustrated in FIGS. 7, 8, and/or 9 may be configured to perform the methods, features, or steps illustrated in FIGS. 2, 3, 4, 5, and/or 6.

Figure 10:
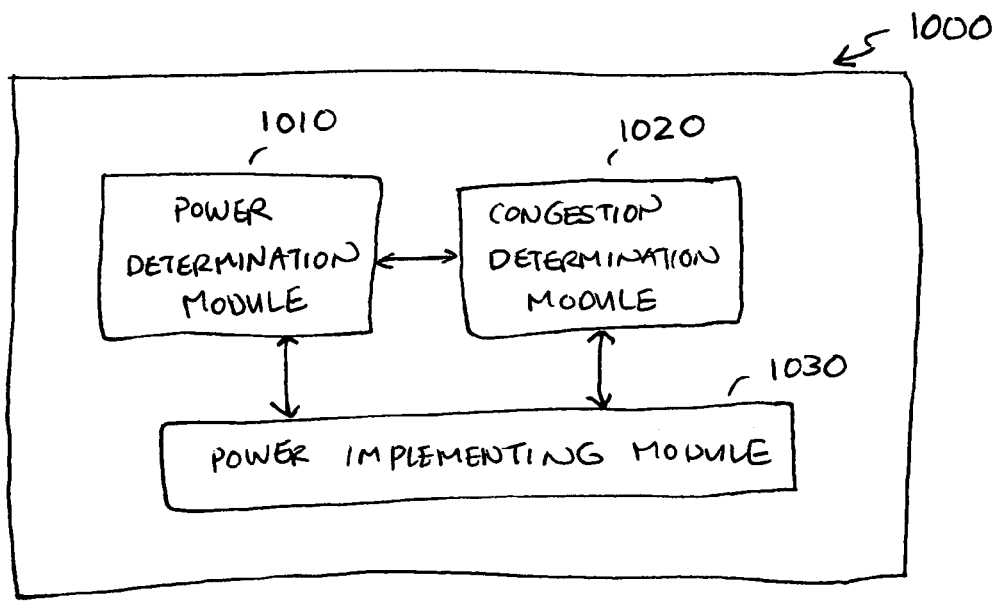
FIG. 10 illustrates an example device for implementing medium access control.

It should be noted that the foregoing embodiments are merely examples and are not to be construed as limiting the invention. For example, a device for implementing medium access control may comprise means for determining a maximum received power limit for each of one or more wireless devices operating on an interference shared communication channel; means for determining whether congestion is present in the communication channel; and means for implementing selective transmit power control of the one or more wireless devices to achieve a desired congestion level. Here, the means for determining a maximum received power limit may be comprised of a power determination module 1010 as shown in apparatus 1000 of FIG. 10. The means for determining whether congestion is present may be comprised of a congestion determining module 1020 and the means for implementing selective transmit power control may be comprised of power implementing module 1030, as shown in apparatus 1000.

Figure 11:
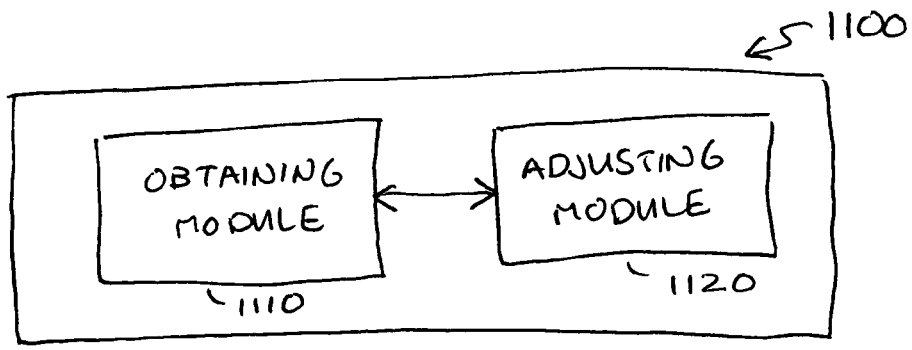
FIG. 11 illustrates another example of a wireless device.

In another example, a wireless device may comprise means for obtaining a maximum transmit power limit; and means for autonomously adjusting a reverse link transmission rate and transmit power to meet a desired grade of service while maintaining the transmit power at or below the maximum transmit power limit. The wireless device may further comprise means for receiving power control commands; and means for estimating the maximum transmit power limit by ascertaining the power levels at which power control commands are received. Also, the wireless device may further comprising: means for determining a quality of service for the reverse link communication channel based on feedback of whether transmitted information was successfully decoded; and means for adjusting the reverse link transmission rate and transmit power so that the quality of service meets the desired grade of service. Here, the means for obtaining a maximum transmit power limit may be comprised of a power obtaining module 1110 as shown in apparatus 1100 of FIG. 11. The means for autonomously adjusting the reverse link may be comprised of an adjusting module 1120 as shown in apparatus 1100.

Alternatively, one or more elements of apparatus 1000 and/or apparatus 1100 may be implemented by a processor configured to control and/or perform the functions of the one or more elements. Similarly, one or more elements of apparatus 1000 and/or apparatus 1100 may be implemented by a machine readable medium comprising instructions configured to perform the functions of the one or more elements.

Accordingly, the description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus comprising:
  a communication interface for wirelessly communicating with one or more wireless devices through an interference shared communication channel; and
  a processing unit coupled to the communication interface and configured to:
    determine a maximum received power limit of the apparatus for each of the one or more wireless devices,
    send individualized power control commands to the one or more wireless devices to maintain received power at the apparatus from each of the one or more wireless devices within the corresponding maximum received power limit, and
    determine whether channel congestion is present in the communication channel.

2. The apparatus of claim 1 wherein congestion is present if a ratio of the total power received from all wireless devices and the thermal noise for the communication channel is greater than a threshold amount.

3. The apparatus of claim 1 wherein the processing unit is further configured to
adjust one or more of the maximum received power limits to reduce channel congestion if channel congestion is present.

4. An apparatus comprising:
a communication interface for wirelessly communicating with one or more wireless devices through an interference shared communication channel; and
a processing unit coupled to the communication interface and configured to:
determine a maximum received power limit of the apparatus for each of the one or more wireless devices,
send individualized power control commands to the one or more wireless devices to maintain received power at the apparatus from each of the one or more wireless devices within the corresponding maximum received power limit, and
partition the reverse link of the communication channel among the one or more wireless devices including proportionally partitioning the reverse link of the communication channel among all wireless devices with which the apparatus communicates.

5. An apparatus comprising:
a communication interface for wirelessly communicating with one or more wireless devices through an interference shared communication channel; and
a processing unit coupled to the communication interface and configured to:
determine a maximum received power limit of the apparatus for each of the one or more wireless devices,
send individualized power control commands to the one or more wireless devices to maintain received power at the apparatus from each of the one or more wireless devices within the corresponding maximum received power limit, and
partition the reverse link of the communication channel among the one or more wireless devices by individually adjusting the maximum received power limit for the one or more wireless devices to achieve a desired partition.

6. An apparatus comprising:
a communication interface for wirelessly communicating with one or more wireless devices through an interference shared communication channel; and
a processing unit coupled to the communication interface and configured to:
determine a maximum received power limit of the apparatus for each of the one or more wireless devices,
send individualized power control commands to the one or more wireless devices to maintain received power at the apparatus from each of the one or more wireless devices within the corresponding maximum received power limit,
determine a minimum received power limit of the apparatus for each of the one or more wireless devices, and
send a power control command to one or more of the wireless devices to maintain the received power at the apparatus from each of the one or more wireless devices above the corresponding minimum received power limit.

7. A device for implementing medium access control, comprising:
means for determining a maximum received power limit of the device for each of one or more wireless devices operating on an interference shared communication channel;
means for determining whether congestion is present in the communication channel; and
means for implementing selective transmit power control of the one or more wireless devices to achieve a desired congestion level.

8. The device of claim 7 further comprising:
means for partitioning the reverse link of the communication channel among the one or more wireless devices operating on the reverse link of the communication channel by individually adjusting the maximum received power limit of the device for the one or more wireless devices.

9. A method for implementing medium access control comprising:
determining a maximum received power limit of a receiver for each of one or more wireless devices operating on an interference shared communication channel;
determining whether congestion is present in the communication channel; and
implementing selective transmit power control of one or more of the wireless devices to achieve a desired congestion level.

10. The method of claim 9 further comprising:
partitioning the reverse link of the communication channel among the one or more wireless devices.

11. The method of claim 10 further comprising:
individually adjusting the maximum received power limit for one or more wireless devices to achieve a desired partitioning.

12. The method of claim 9 further comprising:
determining a minimum received power limit of the receiver for each of the one or more wireless devices, and
sending a power control command to one or more of the wireless devices to maintain their received power above their corresponding minimum received power limit.

13. A processing unit configured to control:
communicating with one or more wireless devices through an interference shared communication channel;
determining a maximum received power limit for each of one or more wireless devices communicating on an interference shared communication channel;
sending a power control command to a wireless device to maintain its received power within its corresponding maximum received power limit;
determining whether congestion is present in the communication channel; and
reducing congestion by adjusting one or more of the maximum received power limits if congestion is greater than a threshold level.

14. The processing unit of claim 13 further configured to control:
partitioning the reverse link of the communication channel among a plurality of the one or more wireless devices operating on the communication channel.

15. A non-transitory machine-readable medium comprising instructions executable by a processor for medium access control of an interference shared communication channel, which when executed by a processor, causes the processor to perform operations comprising:
determining a maximum received power limit of a receiver for each of one or more wireless devices operating on the interference shared communication channel;

determining whether congestion is present in the communication channel; and sending individualized transmit power control commands to the one or more of wireless devices in relation to their corresponding maximum received power limits, wherein sending the individualized transmit power control commands is responsive to a congestion level of the communication channel.

16. The non-transitory machine-readable medium of claim 15 further comprising:

individually adjusting the maximum received power limit for the one or more wireless devices to partition the reverse link of the communication channel among the one or more wireless devices.

* * * * *